(12) United States Patent
Pluciński et al.

(10) Patent No.: US 10,309,542 B2
(45) Date of Patent: Jun. 4, 2019

(54) SERVO VALVE SPOOL

(71) Applicant: Hamilton Sundstrand Corporation, Charlotte, NC (US)

(72) Inventors: Wojciech Pluciński, Września (PL); Michal Bieleń, Syców (PL); Michal Nowak, Wroclaw (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 15/680,471

(22) Filed: Aug. 18, 2017

(65) Prior Publication Data

US 2018/0051817 A1 Feb. 22, 2018

(30) Foreign Application Priority Data

Aug. 18, 2016 (EP) ..................... 16461552

(51) Int. Cl.
*F16K 11/07* (2006.01)
*F16K 31/04* (2006.01)
(Continued)

(52) U.S. Cl.
CPC ............ *F16K 11/0708* (2013.01); *F15B 9/06* (2013.01); *F15B 13/0436* (2013.01); *F15B 13/0438* (2013.01); *F16K 31/04* (2013.01); *F16K 31/124* (2013.01); *F16K 31/426* (2013.01); *F15B 13/0402* (2013.01); *F15B 13/042* (2013.01);
(Continued)

(58) Field of Classification Search
CPC .... F16K 11/0708; F16K 31/04; F16K 31/124; F16K 31/426; F15B 9/06; F15B 13/0436; F15B 13/0438; F15B 13/0402; F15B 13/042; F15B 13/044; Y10T 137/87169–137/87241; Y10T 137/86493–137/8671; Y10T 137/0402;
(Continued)

(56) References Cited

U.S. PATENT DOCUMENTS 3,814,131 A 6/1974 Takahashi et al.
4,285,358 A 8/1981 Haydt
(Continued)

FOREIGN PATENT DOCUMENTS

FR 3025844 A1 3/2016
WO 2013053668 A1 4/2013

OTHER PUBLICATIONS

Extended European Search Report for International Application No. 16461552.8 dated Jan. 30, 2017, 6 pages.

*Primary Examiner* — Craig J Price
(74) *Attorney, Agent, or Firm* — Cantor Colburn LLP

(57) ABSTRACT

A spool assembly for a second stage of a servo valve comprises a spool having an axis (L) and an opening for a feedback member provided in a central region of the spool extending perpendicular to the axis. An adjustable joint is provided within the spool for securing a feedback member relative to the spool, comprising first and second jaw arms being displaceable relative to each other along the axis of the spool. The jaw arms have opposing clamping surfaces, wherein the clamping surfaces are arranged to be drawn towards each other as the jaw arms are drawn away from each other, such that a feedback member can be clamped between the opposed clamping surfaces of the jaw arms and thereby secured relative to the spool.

14 Claims, 4 Drawing Sheets

(51) Int. Cl.
*F16K 31/124* (2006.01)
*F15B 9/06* (2006.01)
*F15B 13/043* (2006.01)
*F16K 31/42* (2006.01)
*F15B 13/04* (2006.01)
*F15B 13/042* (2006.01)
*F15B 13/044* (2006.01)

(52) U.S. Cl.
CPC ....... *F15B 13/044* (2013.01); *Y10T 137/0486* (2015.04); *Y10T 137/86598* (2015.04)

(58) Field of Classification Search
CPC ......... Y10T 137/0441; Y10T 137/0486; Y10T 137/0491
USPC ............... 251/77, 79, 81; 137/596–596.2, 137/625.2–625.49, 15.01, 15.08, 15.17, 137/15.18, 625.62
See application file for complete search history.

(56) References Cited

U.S. PATENT DOCUMENTS

| | | | |
|---|---|---|---|
| 5,573,036 A | 11/1996 | Porter et al. | |
| 6,786,236 B2 | 9/2004 | Jansen | |
| 8,967,179 B2* | 3/2015 | Ozzello | F15B 13/0436 137/625.61 |
| 9,377,122 B2* | 6/2016 | Druhan | F16K 31/041 |
| 9,644,645 B2* | 5/2017 | Ozzello | F15B 13/043 |
| 9,897,116 B2* | 2/2018 | Ozzello | F15B 19/005 |
| 2015/0176720 A1 | 6/2015 | De La Chevasnerie et al. | |

\* cited by examiner

SERVO VALVE SPOOL

FOREIGN PRIORITY

This application claims priority to European Patent Application No. 16461552.8 filed Aug. 18, 2016, the entire contents of which is incorporated herein by reference.

FIELD

The present disclosure relates to a servo valve, and in particular to an adjustable joint for a spool of a servo valve.

BACKGROUND

Electrohydraulic servo valves are typically used to control how hydraulic fluid is ported to an actuator, allowing for precise control of the position, velocity, pressure and force of the actuator. For example, many aircraft flight controls and engine controls are actuated using servo valves. A typical electrohydraulic servo valve comprises an electrical torque motor (a first stage) which controls the flow of hydraulic fluid driving a spool valve or servo (a second stage), which can in turn control flow to an actuator.

The hydraulic second stage often comprises a spool disposed within a sleeve. The position of the spool within the sleeve is controlled by the first stage, which establishes a differential pressure across the servo, causing the spool to move within the sleeve. The position of the spool within the sleeve controls the flow of hydraulic fluid to the actuator. A hydraulic amplifier acts between the first and second stages to vary the piloting flow. The hydraulic amplifier can have various different designs, for example a jet pipe and receivers, a jet deflector and receivers, or a nozzle flapper.

Many servo valve designs incorporate a mechanical feedback member to equilibrate the torque applied by the first stage. This feedback member is fixed at one end to the spool and at the other end to the hydraulic amplifier. Connection between the feedback member and the spool is often achieved with a ball-in-slot joint. The feedback member is terminated by a ball that engages a slot or hole at the centre of the spool. Advantages of a ball-in-slot design include that it alleviates binding problems. However, premature wear of the ball in the feedback mechanism can degrade the valve's performance and reduce its lifetime. To provide the ball with extended wear protection, the ball can be made from materials such as tungsten carbide or sapphire, but these can be expensive to produce.

In addition, the use of a ball-in-socket joint does not allow for the adjustment of the null-bias position of the feedback member relative to the spool, thereby accommodating any tolerances established on assembly or movement during use. It is thus desirable to provide an adjustable joint that can secure a feedback member to a spool of a servo valve.

US 2015/0176720 A1 discloses an arrangement whereby a feedback spring is attached to the spool by at least one fixing member, such as one or more screws. For instance, an end of the spring member may be clamped between a pair of screws passing axially through the spool. One or more spacers can be positioned between the screws and the feedback spring. The one or more spacers may be used to accommodate any tolerances from the screws.

There remains a need for an improved design of an adjustable joint that can secure a feedback member to a spool of a servo valve.

SUMMARY

According to a first aspect, there is provided a spool assembly for a second stage of a servo valve comprising: a spool having an axis and an opening for a feedback member provided in a central region of the spool extending perpendicular to the axis; and an adjustable joint provided within the spool for securing a feedback member relative to the spool, comprising first and second jaw arms being displaceable relative to each other along the axis of the spool, the jaw arms having opposing clamping surfaces, wherein the clamping surfaces are arranged to be drawn towards each other as the jaw arms are drawn away from each other, such that a feedback member can be clamped between the opposed clamping surfaces of the jaw arms and thereby secured relative to the spool.

In a further embodiment of the above, the clamping surface of each jaw arm may be provided by a head of the jaw arm. The head may be in the form of a claw or may be provided by a flange portion having an aperture.

In a further embodiment of the above, the heads may hold a feedback member in shear.

In a further embodiment of any of the above, the opening may be located at a central position along the axis and the adjustable joint may permit securing of a feedback member in an off-centre position.

In a further embodiment of any of the above, the first jaw arm may extend from a first spool end to the central region and the second jaw arm may extend from a second spool end to the central region, each jaw arm providing a tensioning portion in the spool end and a head portion in the central region; the head portions of the first and second jaw arms may each provide a head; the head of one jaw arm may be positioned beyond the head of the other jaw arm in a direction along the axis of the spool, the head having the clamping surface; and the heads may be arranged to be drawn towards each other when under tension from the tensioning portion.

In a further embodiment of any of the above, the head of each head portion may comprise a claw, and the claw may be provided by a recess formed in a jaw face of the head portion that is arranged to be drawn over the jaw face of the other jaw arm.

In a further embodiment of any of the above, the recesses in both head portions, when aligned or partially aligned, may provide a slot for receiving and clamping a feedback member.

In a further embodiment of any of the above, each recess may be formed with an arcuate surface arranged for contacting a surface of a feedback member.

In a further embodiment of any of the above, the jaw face may comprise a land either side of the recess providing guiding surfaces for the head portions of the jaw arms to be drawn past one another.

In a further embodiment of any of the above, the head portions of the first and second jaw arms may comprise at least one flange portion, each flange portion having an aperture having an interior surface which provides the clamping surface.

In a further embodiment of any of the above, each tensioning portion may comprise a nut on a threaded section of the jaw arm that can be tightened to draw the clamping surface towards the clamping surface of the other jaw arm.

In a further embodiment of any of the above, the nut may urge against a thrust surface of the spool.

In a further embodiment of any of the above, the spool may comprise a formation for reacting torque when tightening the jaw arm.

In a further embodiment of any of the above, the spool assembly may comprise a feedback member from a first stage of the servo valve.

According to a second aspect, there is provided a method of securing a feedback member to a spool assembly for a second stage of a servo valve, the method comprising clamping the feedback member between opposed clamping surfaces of first and second jaw arms of an adjustable joint provided within a spool, wherein the clamping surfaces are drawn towards one another under tension to clamp the feedback member therebetween.

In a further embodiment of the above, the clamping surfaces may be in the form of heads.

In a further embodiment of the above, the heads may hold the feedback member in shear.

In a further embodiment of any of the above, the method may further comprise adjusting the position of the adjustable joint within the spool to secure the feedback member in an off-centre position.

These and other features of the systems and methods of the subject disclosure will become more readily apparent to those skilled in the art from the following detailed description taken in conjunction with the drawings, which illustrate embodiments of the present disclosure by way of example only.

FIGURES

So that those skilled in the art to which the subject disclosure appertains will readily understand how to make and use the devices and methods of the subject disclosure without undue experimentation, embodiments thereof will be described in detail herein below by way of example only and with reference to certain figures, wherein.

DETAILED DESCRIPTION

Figure 1:
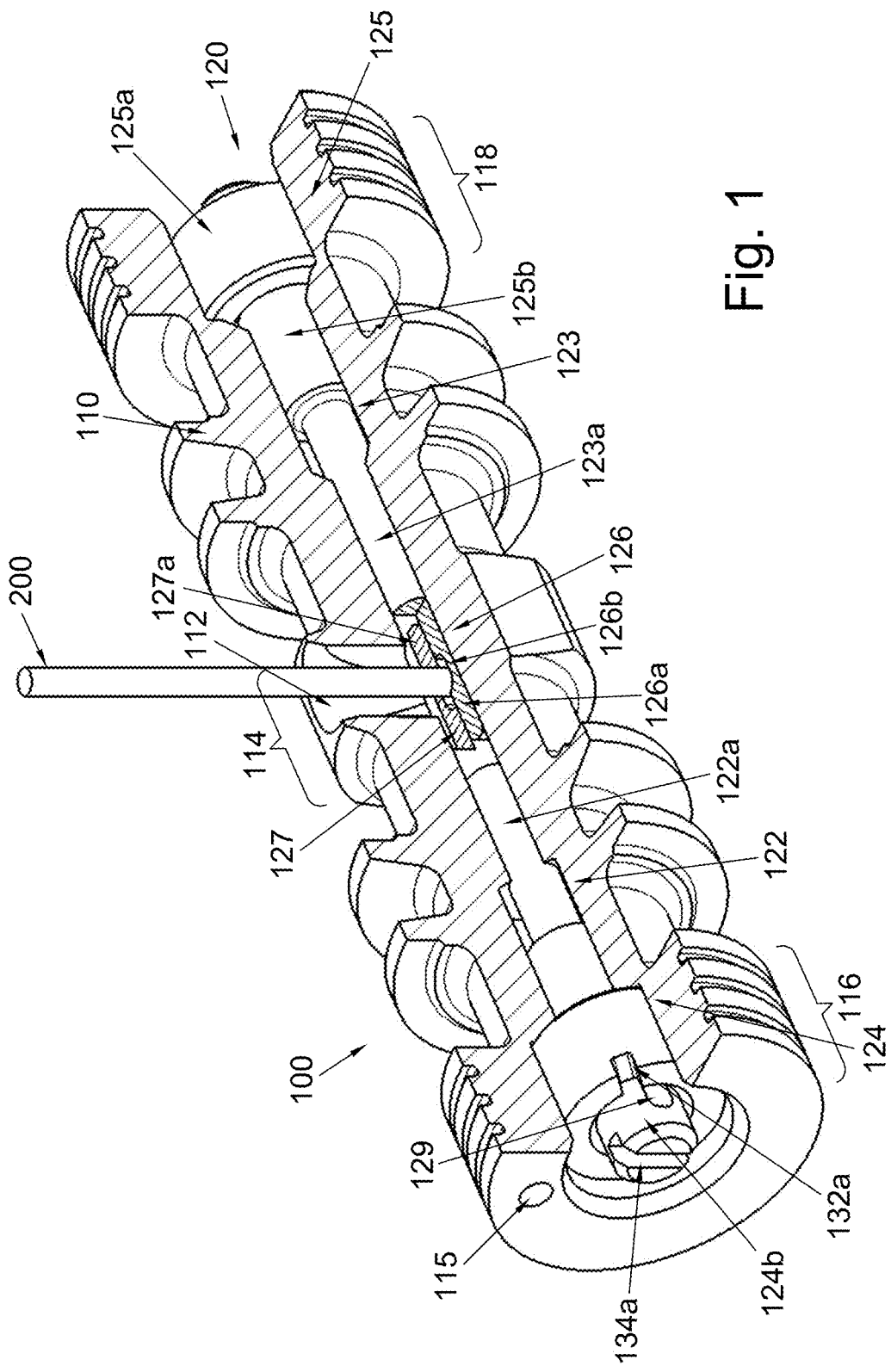
FIG. 1 shows a schematic of an exemplary spool assembly for a second stage of a servo valve.

Reference will now be made to the drawings wherein like reference numerals identify similar structural features or aspects of the subject disclosure. For purposes of explanation and illustration, and not limitation, an illustrative view of an embodiment of a spool assembly is shown in FIG. 1 and is designated generally by reference character 100. Other aspects of this disclosure are shown in FIGS. 2A to 3.

The spool assembly 100 comprises a spool 110 and an adjustable joint 120 provided within the spool 110.

The spool 110 comprises an opening 112 in a central region 114 of the spool 110. The spool 110 has a first spool end 116 and a second spool end 118.

Figure 2A:
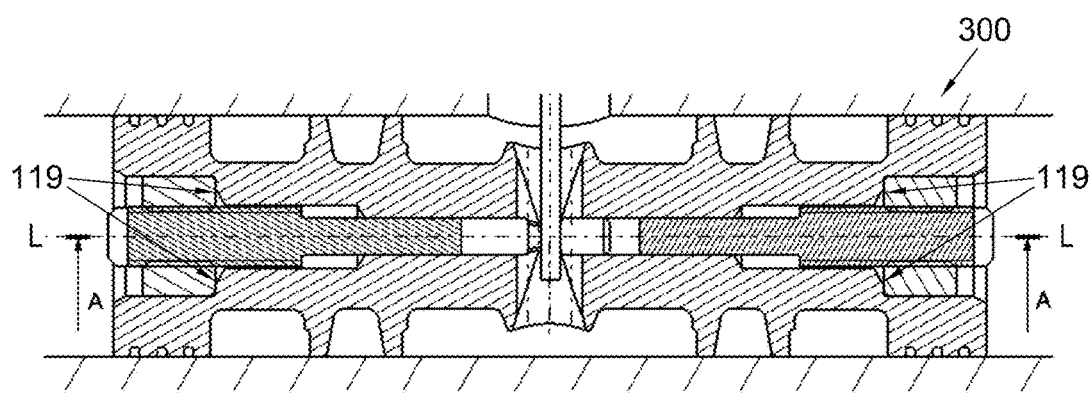
FIG. 2A shows a cross-sectional view of the spool assembly of FIG. 1 from one side along the axis of the spool.
Figure 2B:
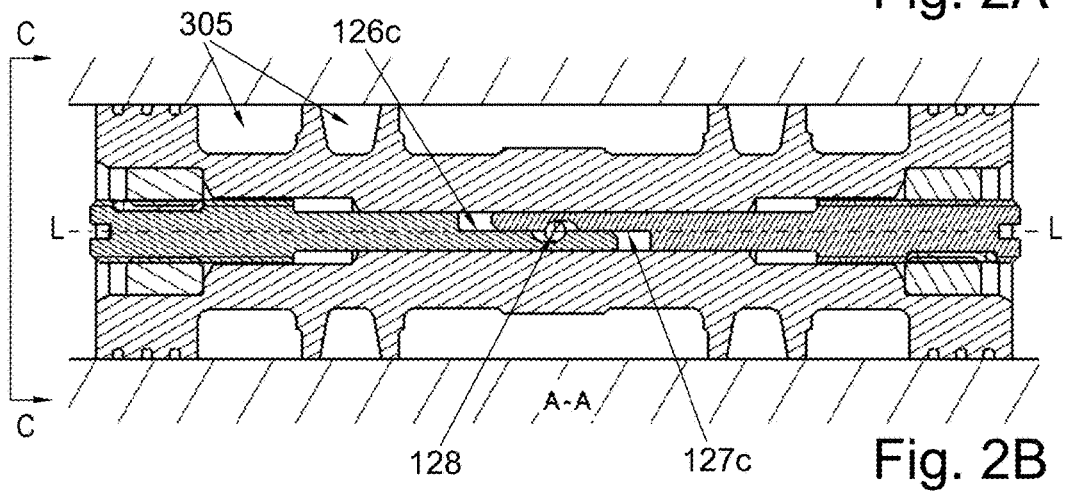
FIG. 2B shows a cross-sectional view of the spool assembly of FIG. 1 from above along the axis of the spool.
Figure 3:
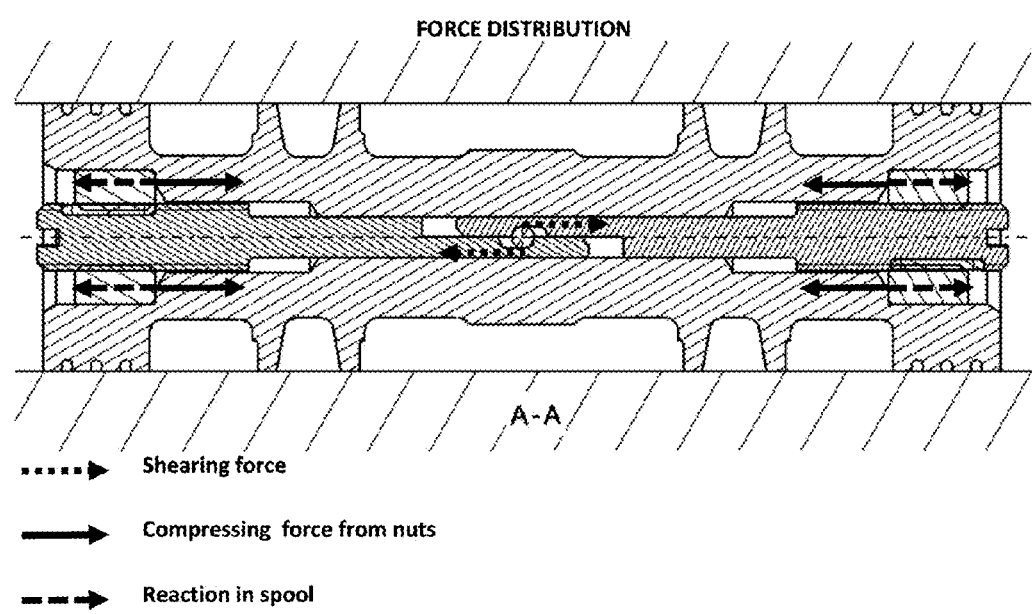
FIG. 3 shows a schematic of the distribution of force in the spool assembly of FIG. 1 when viewed from above.

Referring additionally to FIGS. 2A and 2B, the spool 110 may be slidingly mounted in a hydraulic block or sleeve 300 for movement along an axis L of the spool. It is anticipated that the spool 110 may be generally cylindrical, with a number of circumferential channels 305 formed in its exterior face. The design of such channels will be known to those skilled in the art.

The adjustable joint 120 comprises a first jaw arm 122 extending from the first spool end 116 to the central region 114 of the spool 110, and a second jaw arm 123 extending from the second spool end 118 to the central region 114.

Each jaw arm 122, 123 comprises a tensioning portion 124, 125 towards the respective spool end 116, 118 and a head portion 126, 127 towards the central region 114 of the spool. The tensioning portion 124, 125 may be separated from the head portion 126, 127 by a jaw arm body 122a, 123a. The tensioning portion 124, 125 and jaw arm body 122a, 123a may be substantially circular in cross-section, though other cross-sections may be suitable.

The head portions 126, 127 of the first and second jaw arms 122, 123 overlap and extend past one another within the spool 110. Each head portion 126, 127 has a head 126a, 127a. The head 126a, 127a may comprise a claw. The head 126a, 127a or claw may be provided in a far end of the jaw arm 122, 123, separated from the jaw arm body 122a, 123a by a recess 126b, 127b formed in a jaw face 126c, 127c.

Each jaw arm 122, 123 is configured to be displaceable relative to the other along the axis L of the spool 110. The jaw faces 126c, 127c may serve as guiding surfaces for the head portions 126, 127 of the jaw arms 122, 123 to be drawn past one another.

The heads 126a, 127a may be positioned such that the recesses 126b, 127b align or partially align. The recesses 126b, 127b, when aligned, may provide a slot 128 for receiving and clamping a feedback member 200. Each recess 126b, 127b may be formed with an arcuate surface arranged for contacting a surface of the feedback member 200. The arcuate surface may have a radius of curvature corresponding to that of the feedback member 200.

The tensioning portion 124, 125 of each jaw arm 122, 123 may comprise a nut 124a, 125a on a threaded section 124b, 125b of the jaw arm 122, 123. The nut 124a, 125a may urge against a thrust surface 119 of the spool 110. The thrust surface 119 may be provided by a cylindrical recess in a spool end 116, 118 that is sufficiently deep to house the nut 124a, 125a below the surface of the spool end 116, 118.

Figure 2C:
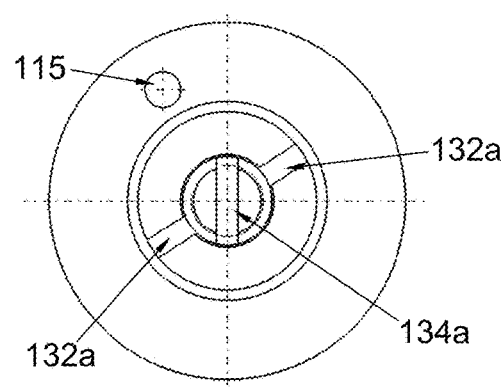
FIG. 2C shows an end view of the spool assembly of FIG. 1.

Referring additionally to FIG. 2C, the threaded sections 124b, 125b may be provided with a feature 134a, 134b on an end face or portion thereof, which is configured to engage with a tool (not shown). Similarly, the nuts 124a, 125a may be provided with at least one feature 132a, 132b on an outer face of portion, which is configured to engage with the same or a different tool. The features 132a, 132b, 134a, 134b may comprise slots or other shapes capable of transferring torque into the nut 124a, 125a or jaw arm 122, 123 using a tool.

During installation or maintenance, adjustment of the position of the jaw arms 122, 123 may be achieved through use of the tool. The tool may engage with the feature 134a, 134b on the end face or portion of the threaded section 124b, 125b to hold the jaw arm 122, 123 in its desired position. Simultaneously, the same or a second tool may be engaged with the at least one feature 132a, 132b on the outer face of portion of the nut 124a, 125a. The nut 124a, 125a may then be turned until it is urged against the thrust surface 119 of the spool 110, securing the jaw arms 122, 123 in position. By tightening the nuts 124a, 125a, the first and second jaw arms 122, 123 are pulled past each other, drawing the respective heads 126a, 127a against opposite sides of the feedback member 200, clamping it within the slot 128 through tension in the jaw arm bodies 122a, 123a. By keeping the jaw arm 122, 123 in its desired rotational position and turning the nut 124a, 125a, bending of the feedback member 200 provided in the slot 128 may be avoided. However, it is anticipated that the nut 124a, 125a may be held steady while the jaw arm 122, 123 is rotated and set in its desired position (e.g. before introduction of the feedback member 200), or a combination thereof.

To help secure the nut 124a, 125a in its position and prevent it becoming undone, a self-locking thread, adhesive, or elastic insert 129 may be provided.

By providing the features 132a, 132b, 134a, 134b for engaging with the tool on the end faces or portions of the nuts 124a, 125a and threaded sections 124b, 125b, the adjustable joint 120 can be easily accessed and adjusted during use and maintenance.

The spool 110 may comprise a formation for reacting torque when tightening the jaw arms 122, 123. For example, a spool end 116, 118 may comprise a feature 115 for engaging with a tool. The feature 115 may comprise a hole or recess which may extend longitudinally into the spool 110. The feature 115 may be circular in cross-section as shown or other shapes. During adjustment of the position of the jaw arms 122, 123, a tool may be inserted into the features 115 to hold the spool 110 steady and prevent it from rotating about axis L-L, thereby preventing damage to the feedback member 200.

A further advantage of the above-configuration is that, since the positions of the jaw arms 122, 123 may be adjusted, the position of the slot 128 for receiving and clamping the feedback member 200 may also be adjusted. The adjustable joint 120 permits securing the feedback member 200 in an off-centre position, and allows the null-bias position of the feedback member 200 to be adjusted.

Axial holes may be drilled (or otherwise machined) in the spool 110 at both the first and second spool ends 116, 118 to a first depth to accommodate the nut 124a, 125a, thereby defining the thrust surface 119. Axial holes may be drilled to a second depth to accommodate the threaded section 124b, 125b of the tensioning portion 124, 125. An axial hole may extend through the spool 110 to accommodate the head portions 126, 127 and the jaw arm bodies 122a, 123a.

The above configuration does not require the spool 110 to be threaded, which is an advantage over the prior art system. The spool 110 is easier to manufacture. Additionally, the spool 110 can be formed from fully hardened steel.

Referring additionally to FIG. 3, a further advantage of this design is that the spool 110 is axially compressed by the nuts 124a, 125a. The spool 110 is brittle and being in a state of compression (and not tension) is thus highly desirable.

The opening 112 of the spool 110 can accommodate a feedback member 200 which is secured to the adjustable joint 120. The feedback member 120 may extend perpendicular to the axis L of the spool 110, as shown in FIG. 1. The feedback member 200 may be held between the heads 126a, 127a in the slot 128.

An advantage of this arrangement is that, unlike the ball-in-socket configuration of the prior art, the end of the feedback member 200 is held in pure shear, which reduces the risk of wear to the components and transmits the clamping force better. In addition, there is a greater contact surface area between the feedback member 200 and adjustable joint 120, which reduces the contact stresses at the joint compared to the prior art.

The other end of the feedback member 200 can be secured to a first stage of a servo valve, and may be secured in any suitable manner. The first stage of the servo valve may comprise an electrical torque motor and/or a hydraulic amplifier. The hydraulic amplifier may be a nozzle flapper, jet pipe and receivers, jet deflector and receivers or any other well-known configuration. The feedback member may be joined to a working part of the first stage hydraulic amplifier. The feedback member may be joined to a flexure member of the hydraulic amplifier e.g. a flexure tube or torsion member.

Figure 4:
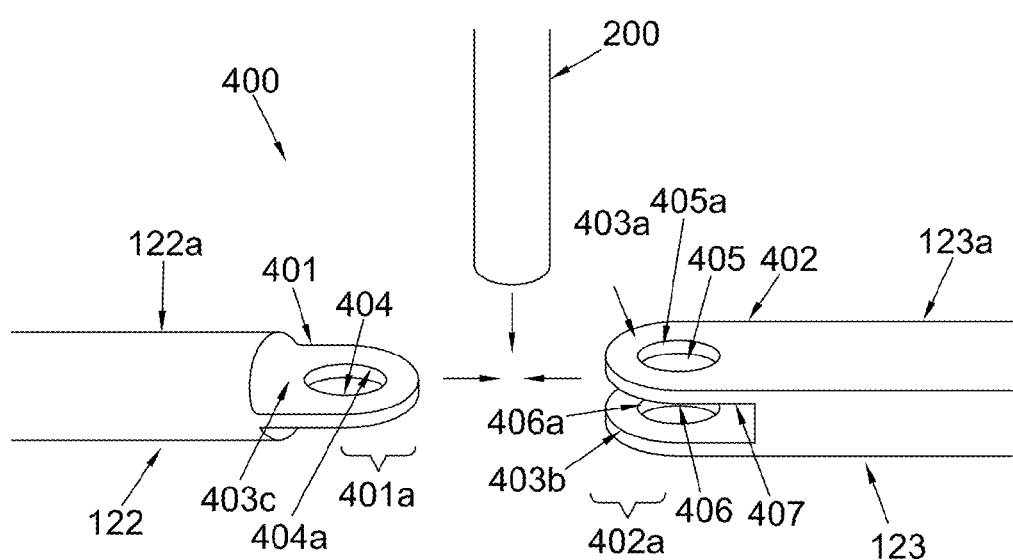
FIG. 4 shows a schematic of an exemplary alternative jaw arm and feedback member arrangement for a spool assembly.

FIG. 4 shows an alternative jaw arm 122, 123 and feedback member 200 arrangement 400 for a spool assembly 100. A first jaw arm 122 may comprise a jaw arm body 122a with at least one flange portion extending therefrom. In the embodiment shown in FIG. 4, the first jaw arm 122 has one flange portion 403c. The flange portion 403c may have an aperture 404 extending therethrough in a direction perpendicular to an axis of the jaw arm 122. The aperture 404 may have an interior surface 404a.

A second jaw arm 123 may comprise a jaw arm body 123a with at least one flange portion extending therefrom. In the embodiment shown in FIG. 4, the second jaw arm 123 has two flange portions 403a, 403b, which are offset from each other in a direction perpendicular to an axis of the second jaw arm 123, to define a channel 407 therebetween. Each flange portion 403a, 403b may have an aperture 405, 406 extending therethrough. The apertures 405, 406 may be aligned above one another. Each aperture 405, 406 may have an interior surface 405a, 406a.

The flange portion 403c of the first jaw arm 122 may be inserted into the channel 407 between the flange portions 403a, 403b of the second jaw arm 123, such that the apertures 404, 405, 406 are aligned above one another to define a passage which can accommodate the feedback member 200.

The apertures 404, 405, 406 may be of any suitable size and cross-section such that, when aligned, they can accommodate the feedback member 200. In FIG. 4, the apertures 404, 405, 406 are stadium-shaped, rather than circular. With circular apertures, particularly where the radius of the aperture matches that of the feedback member 200, there is no room for manoeuvre when aligning the aperture 404 of the first jaw arm 122 with the apertures 405, 406 of the second jaw arm 123, and there can be a tight fit when inserting the feedback member 200. A stadium-shaped aperture enables a broad area of contact between the interior surfaces 404a, 405a, 406a and the feedback member 200 while permitting a degree of tolerance. The radius of the stadium may correspond to that of the feedback member 200.

The arrangement 400 may form part of an adjustable joint 120 which may be provided within a spool 110. Each jaw arm 122, 123 may be provided with a tensioning portion 124, 125 at an opposite end to the flange portions 403a, 403b, 403c. In a manner as described above, each tensioning portion 124, 125 may be provided with nuts 124a, 125a.

In operation, the feedback member 200 may be inserted into the passage defined when the apertures 404, 405, 406 are aligned. By tightening the nuts 124a, 125a, the first and second jaw arms 122, 123 are pulled away from each other, clamping the feedback member 200 within the passage through tension in the jaw arm bodies 122a, 123a. The position of the adjustable joint 120 relative to the spool 110 may be adjusted in a manner as described above.

An advantage of this arrangement is that, as before, the end of the feedback member 200 is held in pure shear, which reduces the risk of wear to the components and transmits the clamping force better. In the embodiment depicted in FIG. 4, the first jaw arm 122 has one flange portion 403c and the second jaw arm 123 has two flange portions 403a, 403b, though each jaw arm 122, 123 need only have one flange portion. An advantage of having more than one flange portion is that there is a larger contact surface area between the feedback member 200 and the interior surfaces 404a, 405*a*, 406*a* of the apertures 404, 405, 406, which reduces the contact stresses at the joint compared to a joint arrangement with fewer flange portions.

While the apparatus and methods of the subject disclosure have been shown and described with reference to embodiments, those skilled in the art will readily appreciate that changes and/or modifications may be made thereto without departing from the scope of the subject disclosure.

The following clauses set out features of the present disclosure that may or may not presently be claimed but which may serve as basis for future amendments and/or a divisional application.

1. A servo valve comprising:
a first stage comprising a feedback member; and a second stage, wherein the second stage comprises a spool assembly comprising:
a spool having an axis and an opening for the feedback member provided in a central region of the spool extending perpendicular to the axis; and
an adjustable joint provided within the spool for securing the feedback member relative to the spool, comprising first and second jaw arms being displaceable relative to each other along the axis of the spool, the jaw arms having opposing clamping surfaces, wherein the clamping surfaces are arranged to be drawn towards each other as the jaw arms are drawn away from each other, and the feedback member is clamped between the opposed clamping surfaces of the jaw arms and thereby secured relative to the spool.

2. The servo valve according to clause 1, wherein the opening is located at a central position along the axis and the adjustable joint permits securing of the feedback member in an off-centre position.

3. The servo valve according to clause 1 or 2, wherein the first jaw arm extends from a first spool end to the central region and the second jaw arm extends from a second spool end to the central region, each jaw arm providing a tensioning portion in the spool end and a head portion in the central region; the head portions of the first and second jaw arms each provide a head; the head of one jaw arm is positioned beyond the head of the other jaw arm in a direction along the axis of the spool, the head having the clamping surface; and the heads are arranged to be drawn towards each other when under tension from the tensioning portion.

4. The servo valve according to clause 3, wherein the head of each head portion comprises a claw, and the claw is provided by a recess formed in a jaw face of the head portion that is arranged to be drawn over the jaw face of the other jaw arm.

5. The servo valve according to clause 4, wherein the recesses in both head portions, when aligned or partially aligned, provide a slot for receiving and clamping the feedback member.

6. The servo valve according to clause 4 or 5, wherein each recess is formed with an arcuate surface arranged for contacting a surface of the feedback member.

7. The servo valve according to clause 4, 5 or 6, wherein the jaw face comprises a land either side of the recess providing guiding surfaces for the head portions of the jaw arms to be drawn past one another.

8. The servo valve according to clause 3, wherein the head portions of the first and second jaw arms comprise at least one flange portion, each flange portion having an aperture having an interior surface which provides the clamping surface.

9. The servo valve according to any preceding clause, wherein each tensioning portion comprises a nut on a threaded section of the jaw arm that can be tightened to draw the clamping surface towards the clamping surface of the other jaw arm, and preferably wherein the nut urges against a thrust surface of the spool.

10. The servo valve according to any preceding clause, wherein the spool comprises a formation for reacting torque when tightening the jaw arm.

The invention claimed is:

1. A spool assembly for a second stage of a servo valve comprising:
a spool having an axis (L) and an opening for a feedback member provided in a central region of the spool extending perpendicular to the axis; and
an adjustable joint provided within the spool for securing the feedback member relative to the spool, comprising first and second jaw arms being displaceable relative to each other along the axis of the spool, the jaw arms having opposing clamping surfaces, wherein the clamping surfaces are arranged to be drawn towards each other as the jaw arms are drawn away from each other, such that the feedback member can be clamped between the opposed clamping surfaces of the jaw arms and thereby secured relative to the spool.

2. The spool assembly according to claim 1, wherein the opening is located at a central position along the axis and the adjustable joint permits securing of the feedback member in an off-centre position.

3. The spool assembly according to claim 1, wherein the first jaw arm extends from a first spool end to the central region and the second jaw arm extends from a second spool end to the central region, each jaw arm providing a tensioning portion in the spool end and a head portion in the central region; the head portions of the first and second jaw arms each provide a head; the head of one jaw arm is positioned beyond the head of the other jaw arm in a direction along the axis of the spool, the head having the clamping surface; and the heads are arranged to be drawn towards each other when under tension from the tensioning portion.

4. The spool assembly according to claim 3, wherein the head of each head portion comprises a claw, and the claw is provided by a recess formed in a jaw face of the head portion that is arranged to be drawn over the jaw face of the other jaw arm.

5. The spool assembly according to claim 4, wherein the recesses in both head portions, when aligned or partially aligned, provide a slot for receiving and clamping the feedback member.

6. The spool assembly according to claim 4, wherein each said recess is formed with an arcuate surface arranged for contacting a surface of the feedback member.

7. The spool assembly according to claim 4, wherein the jaw face comprises a land either side of the recess providing guiding surfaces for the head portions of the jaw arms to be drawn past one another.

8. The spool assembly according to claim 3, wherein the head portions of the first and second jaw arms comprise at least one flange portion, each flange portion having an aperture having an interior surface which provides the clamping surface.

9. The spool assembly according to claim 1, wherein each tensioning portion comprises a nut on a threaded section of the jaw arm that can be tightened to draw the clamping surface towards the clamping surface of the other jaw arm, and preferably wherein the nut urges against a thrust surface of the spool.

10. The spool assembly according to claim 1, wherein the spool comprises a formation for reacting torque when tightening the jaw arm.

11. The spool assembly according to claim 1, wherein the spool assembly comprises the feedback member from a first stage of the servo valve.

12. A second stage of a servo valve comprising:
a spool assembly that includes:
a spool having an axis (L) and an opening for a feedback member provided in a central region of the spool extending perpendicular to the axis; and
an adjustable joint provided within the spool for securing the feedback member relative to the spool, comprising first and second jaw arms being displaceable relative to each other along the axis of the spool, the jaw arms having opposing clamping surfaces, wherein the clamping surfaces are arranged to be drawn towards each other as the jaw arms are drawn away from each other, such that the feedback member can be clamped between the opposed clamping surfaces of the jaw arms and thereby secured relative to the spool.

13. A method of securing a feedback member to a spool assembly for a second stage of a servo valve, the method comprising:
clamping the feedback member between opposed clamping surfaces of first and second jaw arms of an adjustable joint provided within a spool;
wherein the clamping surfaces are drawn towards one another under tension to clamp the feedback member therebetween.

14. The method of claim 13, further comprising:
adjusting the position of the adjustable joint within the spool to secure the feedback member in an off-centre position.

* * * * *